(12) United States Patent
Persson et al.

(10) Patent No.: US 7,850,067 B1
(45) Date of Patent: Dec. 14, 2010

(54) COLOR BAR CODES

(75) Inventors: Carl J. Persson, Olathe, KS (US);
Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 31 days.

(21) Appl. No.: 11/946,039

(22) Filed: Nov. 27, 2007

(51) Int. Cl.
*G06F 17/00* (2006.01)

(52) U.S. Cl. ..................................... 235/375

(58) Field of Classification Search ................ 235/375, 235/462.04, 465, 469; 359/443, 504, 601, 359/614; 455/414.2
See application file for complete search history.

(56) References Cited

U.S. PATENT DOCUMENTS

| | | | |
|---|---|---|---|
| 6,832,729 B1 * | 12/2004 | Perry et al. | 235/472.01 |
| 2003/0061192 A1 * | 3/2003 | McGunn et al. | 707/1 |
| 2003/0076980 A1 * | 4/2003 | Zhang et al. | 382/103 |
| 2004/0243519 A1 | 12/2004 | Perttila et al. | |
| 2005/0122564 A1 * | 6/2005 | Zehner et al. | 359/296 |
| 2006/0214815 A1 * | 9/2006 | Komatsu | 340/956 |
| 2007/0061245 A1 * | 3/2007 | Ramer et al. | 705/37 |

* cited by examiner

*Primary Examiner*—Seung H Lee

(57) ABSTRACT

A device for initiating automatic retrieval of content using a plurality of three-dimensional elements is provided. The device comprises a plurality of three-dimensional elements producing a color pattern. The color pattern is associated with an item of interest and is used to obtain a content related to the item of interest.

19 Claims, 10 Drawing Sheets

COLOR BAR CODES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Billboard advertisements present a special challenge in that they are normally placed along busy highways to reach a large volume of people. However, because they are along busy highways, the people who see them are normally traveling at speeds around 60 mph. This requires anyone who is interested in the product or service featured in the advertisement to memorize the name of the product or service and any additional information associated with it, such as a URL link or a phone number, within a matter of seconds. If an interested person is unable to record the information at that time, perfect recollection of the information at a later time may be difficult.

SUMMARY

In one embodiment, a device for initiating automatic retrieval of content using a plurality of three-dimensional elements is provided. The device comprises a plurality of three-dimensional elements producing a color pattern. The color pattern is associated with an item of interest and is used to obtain a content related to the item of interest.

In another embodiment, a communication system based on a sequence of color patterns is provided. The system comprises a mobile device capturing one or more images of one or more color patterns from a sequence of color patterns. The sequence of color patterns is created by a plurality of colored lights. The system further comprises an application that, when executed on a processor of the mobile device, uses the captured images to automatically retrieve a content related to an item of interest.

In yet another embodiment, a method of content retrieval using a sequence of colored light patterns is provided. The method comprises capturing one or more images of one or more colored light patterns in a sequence of colored light patterns using a camera on a mobile device. The colored light patterns are generated by a plurality of colored lights. The method further comprises decoding the captured images of the one or more colored light patterns, identifying a content based on decoding the captured images, and providing the content to a user of the mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
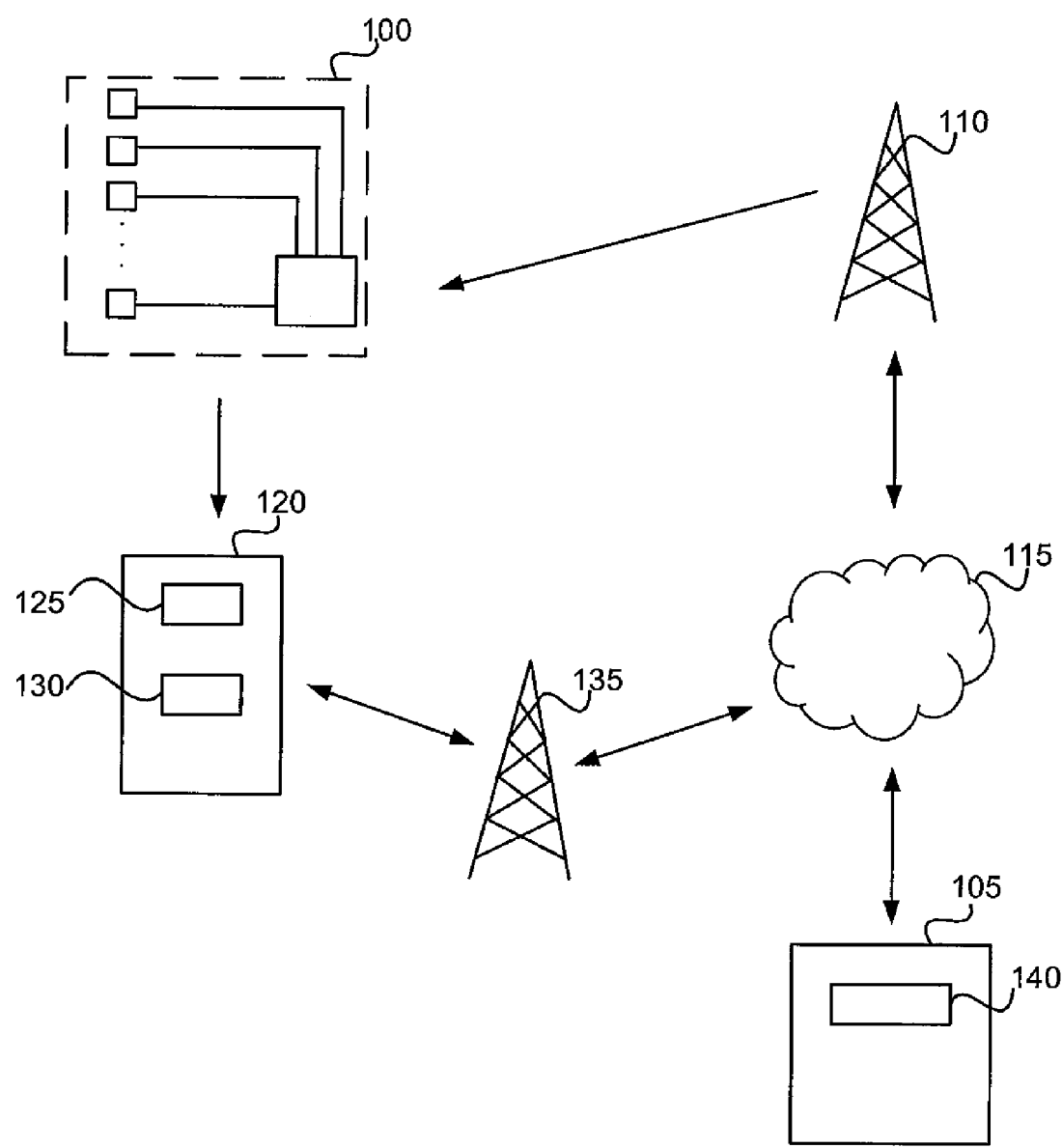
FIG. 1 illustrates a content distribution system according to an embodiment of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Successful marketing not only involves the ability to generate interest in a particular product or service, but also involves the ability to immediately respond to a person's interest in the product or service by providing them with information regarding the product or service. For example, a printed advertisement in a newspaper or magazine may include a uniform resource locator (URL) link or a telephone number for people to obtain more information regarding the product or service featured in the advertisement. If at the time of reading an interested person is unable to respond to the advertisement by either going online or calling, that person may simply keep the printed advertisement or write down the information needed in order to obtain information at a later time. However, a person passing by a billboard advertisement does not always have the ability to record the information provided on the billboard.

The effectiveness of billboard advertisements may be improved by placing static, UPC-type bar codes on billboard advertisements. These one-dimensional, static bar codes allow anyone who is interested in the advertised product or service to obtain information by capturing an image of a static bar code associated with the advertised product or service using their camera phone. However, the use of static bar codes to obtain information may require precise orientation of the camera phone and accurate capture. It may be difficult to achieve the required precision and accuracy using a camera phone, particularly while traveling at high speeds. Moreover, static bar codes may limit the advertiser's flexibility. The owners of the billboards may not be able to update the static bar codes at will to accommodate multiple advertisers or special promotions. Furthermore, the static bar codes have to be large enough to be effective, which reduces the amount of real estate on the billboard that can be used to display the real content of the advertisement. The static, UPC-type bar codes may also reduce the attractiveness of the advertisement.

The present disclosure uses color encoding, preferably colored lights, to trigger the automatic retrieval of content to enhance the value of outdoor advertising. The present disclosure uses a camera's ability to sample images and recognize changes in those images by having the camera sample images of a dynamic sequence of colored light patterns, rather than a static bar code, to provide content. Using a dynamic sequence of colored light patterns provides for greater flexibility in the code and allows billboards to be dynamically updated to accommodate special promotions. Dynamic updates also allow for multiple advertisers to be featured on the same billboard by using different time slots for each advertiser. The use of a static bar code may not allow for flexibility in the code or dynamic updates. The light display may also draw people's attention to the billboard and add to the attraction of the billboard.

Furthermore, the use of a dynamic sequence of colored light patterns allows a significant amount of information to be transmitted in a concentrated manner enabling people to acquire information regarding an advertised product or service from a greater distance. As long as the sequence of colored light patterns is within the range of the camera, the user is able to obtain the desired information. This enhances the value of outdoor advertising, such as billboards.

FIG. 1 illustrates a content distribution system according to an embodiment of the present disclosure. In this embodiment, a plurality of colored lights 100 emits a color code related to an item of interest. A server 105 wirelessly updates the color code by sending an instruction through a network 115. A first base transceiver station 110 is in communication with the network 115 and receives the instruction from the network 115. The first base transceiver station 110 then wirelessly sends the instruction to a receiver associated with the plurality of colored lights 100, and the color code emitted by the plurality of colored lights 100 is updated according to the instruction. A user of a mobile device 120 uses a camera 125 on the mobile device 120 to capture one or more images of the color code by initiating a first application 130 on the mobile device 120.

Wireless updating allows the color code to be updated dynamically to accommodate special promotions. For example, an advertiser can dynamically update the color code to provide content regarding a different promotion every week or every month. Dynamic updates also allow for multiple items to be featured using a different time slot for each item. Thus, a single advertiser may use the billboard to feature different items. For example, in one embodiment, if a department store wanted to feature five different departments, such as cosmetics, jewelry, clothes, shoes, and housewares, the billboard would divide the time among the five departments. In this case, each department could be allotted twelve seconds of billboard time every minute. The color code would also dynamically change every twelve seconds to correspond with the department being featured at that particular time. This would allow all five departments to be featured every minute. Billboard time could also be similarly divided among multiple advertisers. In another embodiment, a different item or advertiser could be featured every second. In this embodiment, the color code would also change every second. The advantage of this particular embodiment is that multiple color codes can be captured by the mobile device 120 within a short period of time, and more content can be retrieved.

Once the first application 130 has captured the images of the color code, the captured images are sent to a second base transceiver station 135. The second base transceiver station 135 receives the captured images and transmits the captured images to the server 105 via the network 115. A second application 140 at the server 105 decodes the received color code to determine the content based on the decoded color code. The content is then sent to the mobile device 120 using the network 115 and the second base transceiver station 135. The content may also be sent to a destination directed by the user of the mobile device 120 such as their home computer, email, etc. The user of the mobile device 120 can then use the received content to obtain information related to the item of interest. The content may be, for example, a URL link, a coupon, or an advertisement. The item of interest may be, for example, a service or a product. An advantage to having the second application 140 on the server 105 decode the color code is that it results in less work for the mobile device 120. Although the first base transceiver station 110 and the second base transceiver station 135 are shown separately, in some embodiments, they may be the same base transceiver station.

Figure 2:
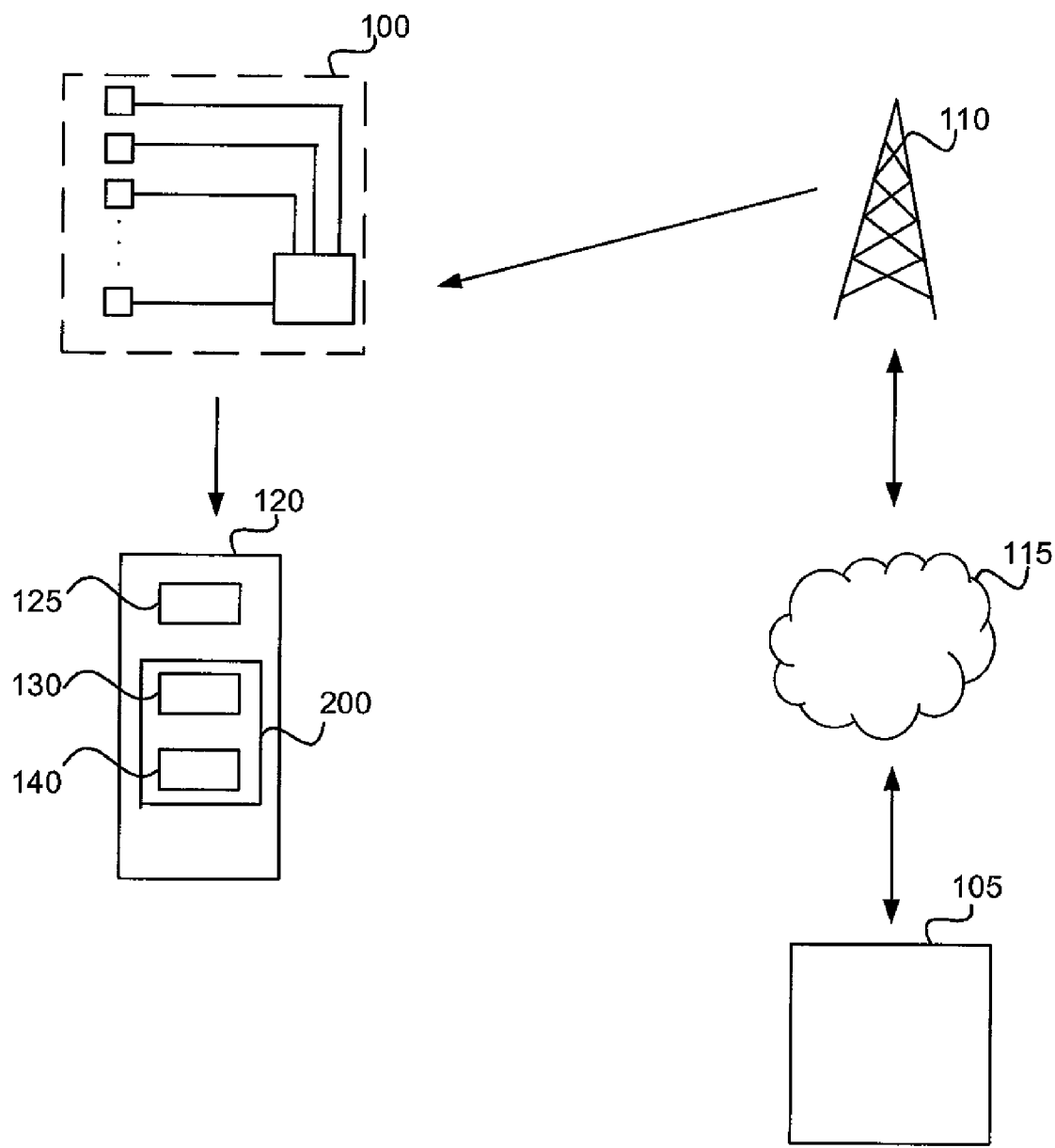
FIG. 2 illustrates another content distribution system according to an embodiment of the present disclosure.

FIG. 2 illustrates another content distribution system according to an embodiment of the present disclosure. In this embodiment, the first application 130 and the second application 140 are both on the mobile device 120. The functions of the first application 130 and the second application 140 may also be carried out by a single third application 200. The advantage of having the mobile device 120 perform both the capturing and the decoding functions is that there is no reliance on a server or a server connection to determine the content based on the decoded color code.

In this embodiment, if the mobile device 120 has access to a network connection at the time of decoding, the mobile device 120 may use that network connection to obtain the additional information provided by the content. If the mobile device 120 does not have access to a network connection at the time of decoding, the mobile device 120 may simply save the content on the mobile device 120 until a network connection is available for obtaining the additional information. In either case, although a network connection may be needed to obtain additional information using the content, a server connection is not needed to determine the content based on the decoded color code.

Figure 3:
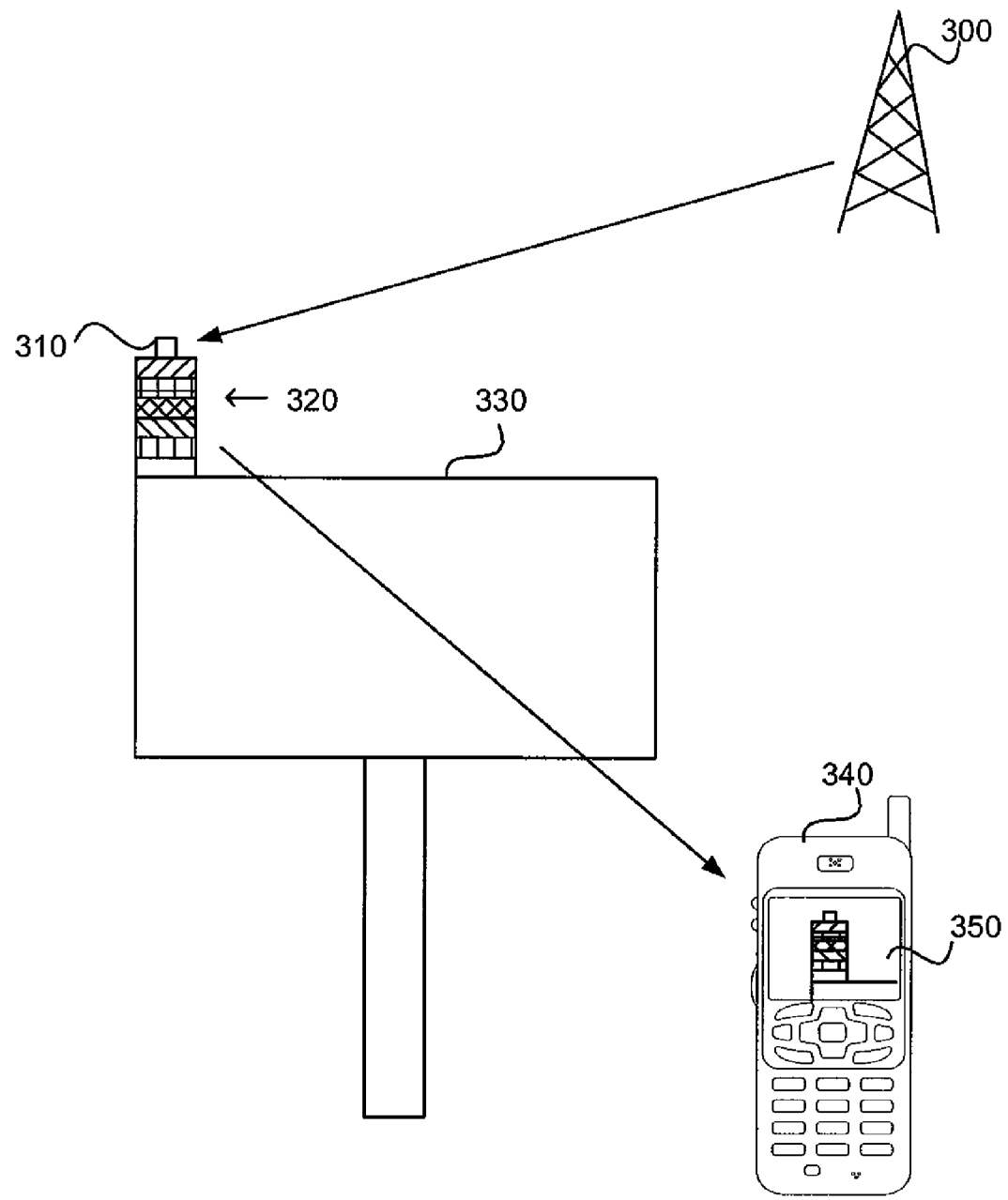
FIG. 3 illustrates yet another content distribution system according to an embodiment of the present disclosure.

FIG. 3 illustrates a content distribution system in which the plurality of colored lights take the form of a plurality of disks illuminated internally according to an embodiment of the present disclosure. In FIG. 3, a base transceiver station 300 sends instructions to a receiver 310 associated with a plurality of colored disks 320. The plurality of colored disks 320 are illuminated internally according to the instructions received from the base transceiver station 300. In this embodiment, the plurality of colored disks 320 arranged in a vertical direction on top of a billboard 330. The different colors are represented by the different cross-hatching patterns on the disks. A mobile device 340 captures an image 350 of the color code using the camera on the mobile device 340 and uses the color code to retrieve content related to an item of interest. In this embodiment, the item of interest is the service or product featured on the billboard 330 at a particular point in time.

Figure 4A:
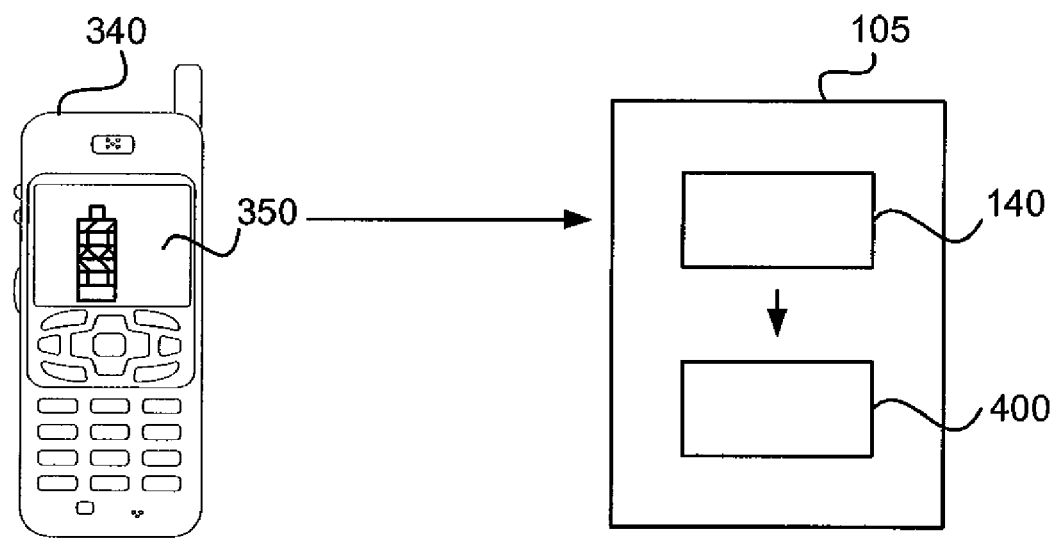
FIG. 4a illustrates a system for decoding a captured color code according to an embodiment of the present disclosure.

FIG. 4a illustrates a system for decoding a captured color code according to an embodiment of the present disclosure. As shown in FIG. 4a, once the mobile device 340 captures the image 350, the mobile device 340 sends the image 350 to the second application 140 on the server 105. The second application 140 uses a resource 400 to decode the color code shown in the image 350 to determine the content 410 that corresponds with the color code shown in the image 350.

Figure 4B:
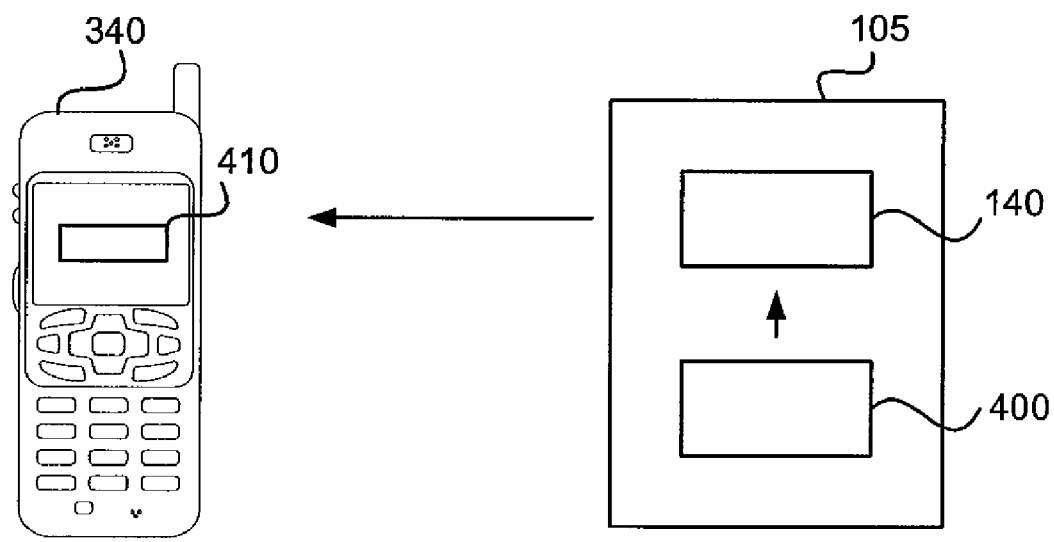
FIG. 4b illustrates a system for providing a content based upon a decoded color code according to an embodiment of the present disclosure.
Figure 5A:
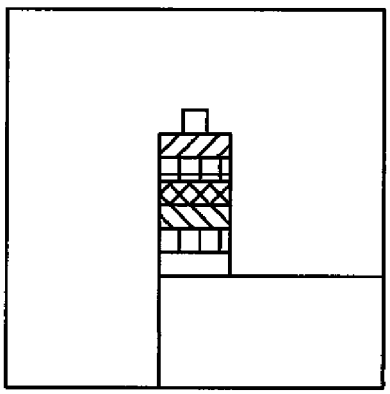
FIG. 5a illustrates the first color pattern of a color code according to an embodiment of the present disclosure.
Figure 5B:
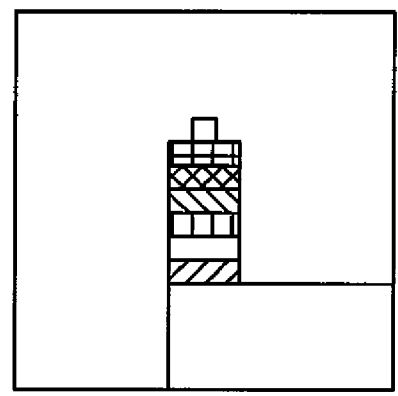
FIG. 5b illustrates the second color pattern of the color code according to an embodiment of the present disclosure.
Figure 5C:
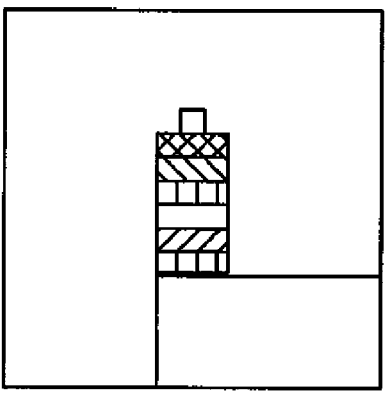
FIG. 5c illustrates the third color pattern of the color code according to an embodiment of the present disclosure.
Figure 5D:
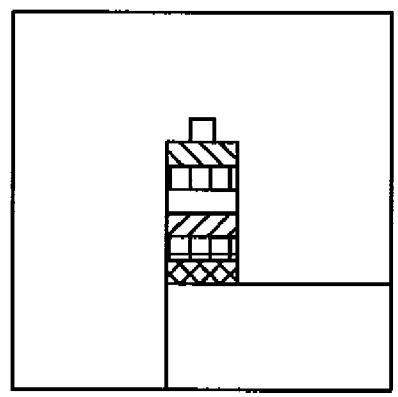
FIG. 5d illustrates the fourth color pattern of the color code according to an embodiment of the present disclosure.
Figure 5E:
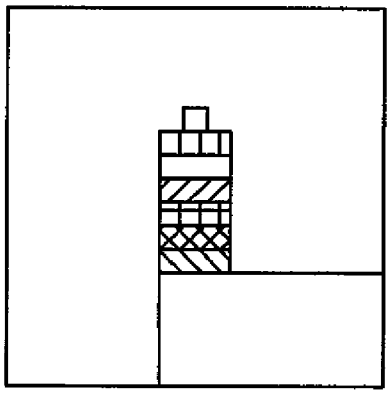
FIG. 5e illustrates the fifth color pattern of the color code according to an embodiment of the present disclosure.
Figure 5F:
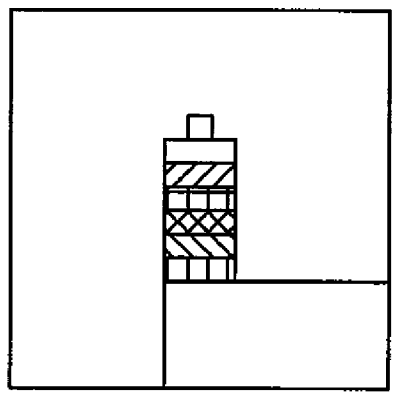
FIG. 5f illustrates the sixth color pattern of the color code according to an embodiment of the present disclosure.

FIG. 4b illustrates a system for providing the content 410 based upon a decoded color code according to an embodiment of the present disclosure. Once the content 410 is obtained from the resource 400 by the second application 140, FIG. 4b shows that the content 410 is displayed on the mobile device 340. The user of the mobile device 340 may then use the content 410 to obtain more information related to the item of interest featured on the billboard 330. Again, although the second application 140 and the resource 400 are described as executing on server 105, either or both could execute on the mobile device 340.

The resource 400 may be any means for decoding the color code. For example, the resource 400 may be a static means for decoding the color code, such as an association table, a lookup table, or a decoding tree. Alternatively, the color code may be a self-coded signal in which the resource 400 for decoding the signal is transmitted as a part of the signal. For example, the first part of the color code would provide the "key" or resource 400 with which to decode the remainder of the color code. In this embodiment, the resource 400 would dynamically change with each color code. Alternatively, the first application 130 or the second application 140 may perform an algorithm that mathematically reduces the color code into a resulting content. In this case, the resource 400 would be the mathematical algorithm performed by the first application 130 or the second application 140.

Moreover, the resource 400 may provide the content 410 based upon the time and the location of the capture. In this case, the resource 400 would look at the time and the location of the capture to determine which color code was transmitted at that particular time and place. Once the color code is determined, the resource 400 would be able to provide the content that corresponds with the color code.

Furthermore, the content 410 referenced by the color code may vary depending upon the location of the capture. For example, a color code consisting of the color pattern of red, green, and blue may provide content related to a Chinese restaurant when that color code is captured in San Francisco. However, that same color code may provide content related to a vineyard when that color code is captured in Napa Valley. Because the same color code can be implemented at different locations, the need to generate new or different color codes for each location is reduced.

In one embodiment, each disk in the plurality of colored disks 320 would be made of a colored material having a static color, and the color code would be determined by the order of the colored disks. The advantage of this particular embodiment is that no power source is needed to illuminate the disks a particular color because the plurality of colored disks 320 are already made of a colored material. Furthermore, unlike one-dimensional bar codes, the plurality of colored disks 320 can be viewed from a greater distance and all directions. Also, the plurality of colored disks 320 are potentially more attractive while occupying less billboard real estate. In another embodiment, each disk in the plurality of colored disks 320 would have a static color, and the color code would be determined by which of the disks are illuminated at a given time. An advantage of this embodiment is that it provides for a flexible code that changes depending upon which of the disks are illuminated at a given time. In yet another embodiment, each disk in the plurality of colored disks 320 could be any one of a plurality of colors. In that case, the color code would be determined not only by which of the disks are illuminated at a given time but also by the color of the illuminated disks. This embodiment provides for a robust code capable of conveying a large amount of information.

If a relatively small amount of information is being encoded in the color code, the entire color code may be conveyed by a single color pattern. In this case, the mobile device 340 would only need to capture one snapshot of the single color pattern in order to obtain the content associated with the item of interest. If a larger amount of information is being encoded in the color code, the color code may be conveyed by a sequence of two or more snapshots of changed color patterns. The color patterns can be pulsed at an effective rate that does not exceed the camera speed of the camera on the mobile device 340. In such a case, the mobile device 340 would need to capture enough of the sequence of color patters in order to determine the content associated with the item of interest. This could happen through a video mode or capture mode or, less preferably, a sequence of snapshots.

FIGS. 5a to 5f illustrate a color code according to an embodiment of the present disclosure. In this embodiment, the color code is conveyed by a sequence of six color patterns. Each color pattern is generated by six disks, and each of the six disks may be any one of six colors. The six colors are represented by the six different cross-hatching patterns on the disks. In FIGS. 5a to 5f, each of the six disks illuminates a different color from one color pattern to the next. Accordingly, this particular coding scheme would have $6^7$ or 279,936 different possible codes.

Although a color code consisting of a sequence of six color patterns using six disks that may be any one of six different colors is shown in this embodiment, one of ordinary skill in the art would recognize that the color code may consists of any number of color patterns using any number of disks that may be any one of a number of colors. Also, although the three-dimensional colored elements are described in terms of being disks, one of ordinary skill in the art would recognize that any three-dimensional shape, such as a sphere or a cube, that allows for the accurate capture of the color code from many different views could be utilized. Furthermore, the three-dimensional objects are shown as arranged in a vertical direction to maximize visibility. However, one of ordinary skill in the art would recognize that the three-dimensional objects could be arranged in any number of ways, including a horizontal direction.

Although the colored elements are described in terms of being three-dimensional, in one embodiment, the colored elements may be two-dimensional colored lights. Although the viewing angle of the two-dimensional colored lights may be more limited than those of the three-dimensional colored elements, the two-dimensional colored lights of the present disclosure still provide the advantages of being dynamically updated and potentially more attractive. As stated earlier, static bar codes do not allow for dynamic updates.

In the case in which the color code consists of a sequence of two or more color patterns, the color code may be either dimensionless or time-based. If the color code is dimensionless, the order in which the mobile device 340 captures the color patterns does not matter. The first application 130 would simply capture the color patterns and determine the beginning of the sequence by where the color patterns start to repeat. If the color code is time-based, then the order in which the mobile device 340 captures the color patterns does matter. In this case, the first application 130 may look for a marker that indicates the start of the sequence in order to capture the sequence of color patterns in the proper order. For example, the marker may be a long pulse of the emitted color pattern that indicates the beginning of the sequence.

Also, there are times, such as driving down a highway, when it is not advisable for the user of the mobile device 340 to use his or her hands to interact with the mobile device 340 any more than necessary. Therefore, to reduce the amount of time that the user actually handles the mobile device 340, the first application 130 may provide the user of the mobile device 340 with speech directed and audible display interfaces for directing the color code initiated content pushes. For example in one embodiment, once the color code is captured, the first application 130 may provide the user of the mobile device 340 with an audible message that describes the content that was derived from the captured color code. The first application 130 may then ask the user if this is the desired content. If the user responds that it is not, then the first application 130 would then provide an audible message asking the user to capture the color code again. If the user responds that it is the desired result, the first application 130 would then ask if the user would like to display the information, save the information, or forward the information. The first application 130 would then perform the task spoken by the user. Accordingly, once the user has captured the image of the color code, the user is able to direct the content display using verbal instructions. This minimizes the need for the user to physically handle the mobile device 340.

Furthermore, the user of the mobile device 340 may not be able to accurately capture the color code while moving at high speeds or from long distances. In one embodiment, the first application 130 may further comprise an isolation feature that quickly isolates the color patterns on each of the captured images to allow for more efficient decoding of the color patterns. After the first application 130 has determined that the color patterns were successfully captured, a successful indication may be provided to the user of the mobile device 340. The successful indication may be in the form of an audible tone or message, a vibration of the mobile device, or a visual signal, such as a message indicating that the capture was successful. The user of the mobile device 340 would then know that they successfully captured the color code.

When errors in capturing the color code occur, a system may provide the user of the mobile device 340 with one or more possible results or with an indication that the mobile device 340 did not capture the color code so that the user can try and capture the color code again if he or she wants the content.

Errors in capturing the color code may occur in one of two cases. In the first case, the error arises due to the failure to capture every color pattern in the sequence of color patterns, i.e. an incomplete sequence capture. In this case, the sequence of color patterns may consists of two or more color patterns, and the mobile device does not capture every color pattern in the sequence. For example, a sequence may consist of five color patterns, and the mobile device 340 only captures three of the color patterns. In the second case, the error arises due to the failure to capture a complete image of one or more of the color patterns, i.e. an incomplete image capture. For example, each color pattern may consist of eight colored elements, and the mobile device only captures five of the eight colored elements.

Figure 6A:
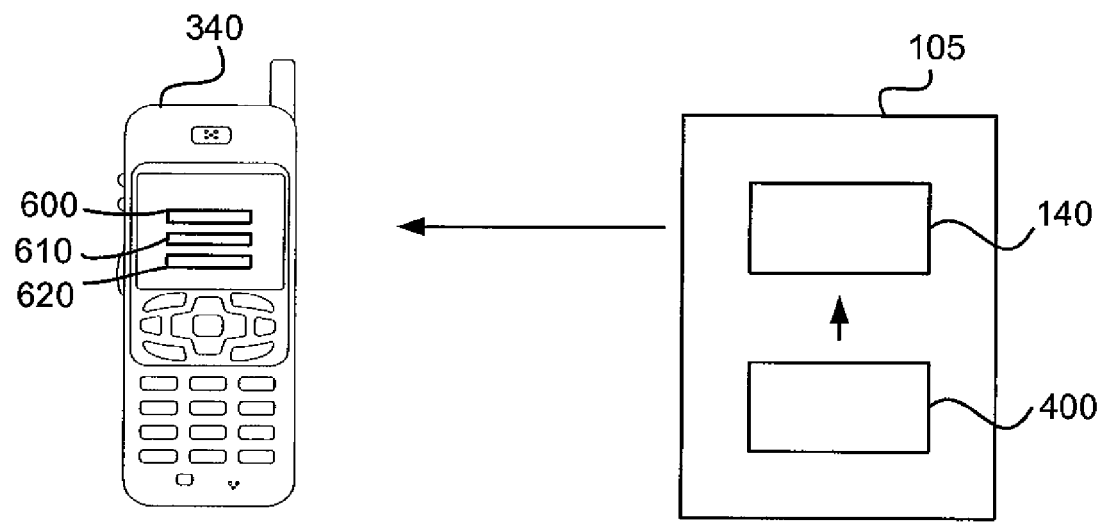
FIG. 6a illustrates a system for accommodating errors according to an embodiment of the present disclosure.

FIG. 6*a* illustrates a system for accommodating errors according to an embodiment of the present disclosure. In this embodiment, the second application 140 uses the resource 400 to find one or more possible results for an incomplete sequence or image captured by the mobile device 340. In one embodiment, the resource 400 may provide possible results based upon the part of the sequence or image that was captured. In another embodiment, the resource 400 may keep track of additional information that is used to determine possible results. For example, as described earlier, the resource 400 may provide possible results based upon the time and the location of the capture. The resource 400 may also provide possible results based upon the retrieval history of the mobile device 340. For example, if the retrieval history of the mobile device 340 indicates that most of the content that was received by the mobile device 340 were related to cars, the resource 400 may provide the mobile device 340 with one or more contents that were related to car advertisements featured within a certain time and vicinity of the capture as one or more possible results. The resource 400 may also provide possible results based upon the retrieval history of other mobile device at the location of the mobile device 340 during the time of capture. For example, if most of the color codes that were captured by other mobile device at the time and the location of the capture were associated with a particular advertisement, then the resource 400 would provide the content associated with that particular advertisement to the mobile device 340 as a possible result. In FIG. 6*a*, the resource 400 was able to provide three possible results 600, 610, and 620 from the incomplete sequence or image that was captured.

The billboard advertisers could also provide a look-up table based on time and location, and the incomplete capture could be compared with the look-up table to fill in the gaps. As noted earlier, this table could also be constructed by the wireless carrier based on successful look-ups by other devices with similar place and potentially similar time.

Figure 6B:
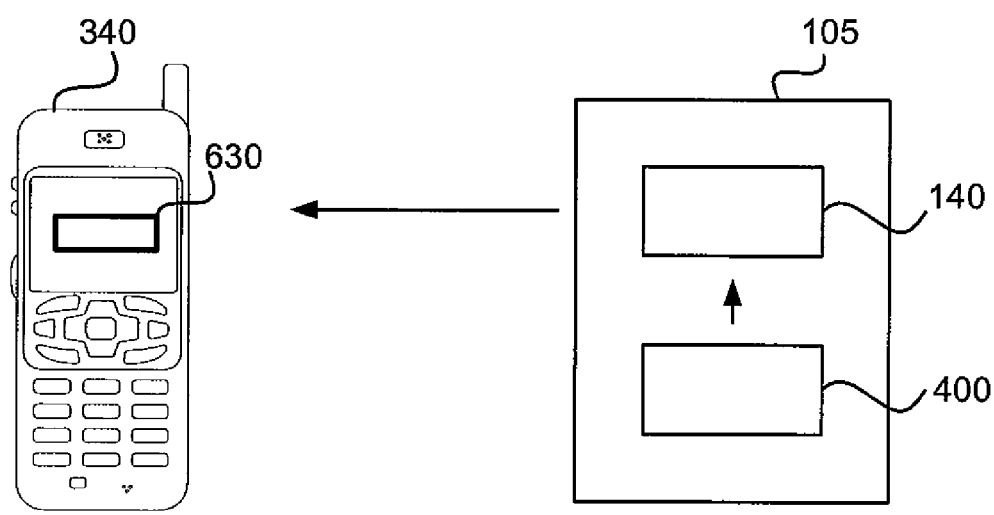
FIG. 6b illustrates another system for accommodating errors according to an embodiment of the present disclosure.

FIG. 6*b* illustrates another system for accommodating errors according to an embodiment of the present disclosure. In FIG. 6*b*, the resource 400 was not able to provide any possible results from the incomplete sequence or image that was captured. In this case, the first application 130 provides the user of the mobile device 340 with an indication 630 that not enough of the color code was captured for any possible results to be provided. This indication may be in the form of an audible tone, a vibration of the mobile device, or a visual signal, such as an error message. The user of the mobile device 340 would then know that he or she needed to capture the color code again if he or she wants the content.

Moreover, in one embodiment, the first application 130 provides the user with a code play interface that allows the user to set preferences for how he or she would like to handle coded information. The code play interface could use experience to learn the user's preferences for treating certain content sources in certain situations.

In another embodiment, the mobile device 340 may also have the ability to add information to the captured code in order to receive a special version of the code-initiated content. For example, the mobile device 340 may have a key that allows the user of the mobile device 340 to have an enhanced level of access to the code-initiated content when the key is combined with the captured color code. This would allow the user to receive special treatment when retrieving the code-initiated content.

In a further embodiment, the mobile device 340 may use the captured light source as a registration point for simple augmented reality applications. This would allow the user to obtain more information about certain environments by linking machine-generated information with the real time camera view.

Figure 7:
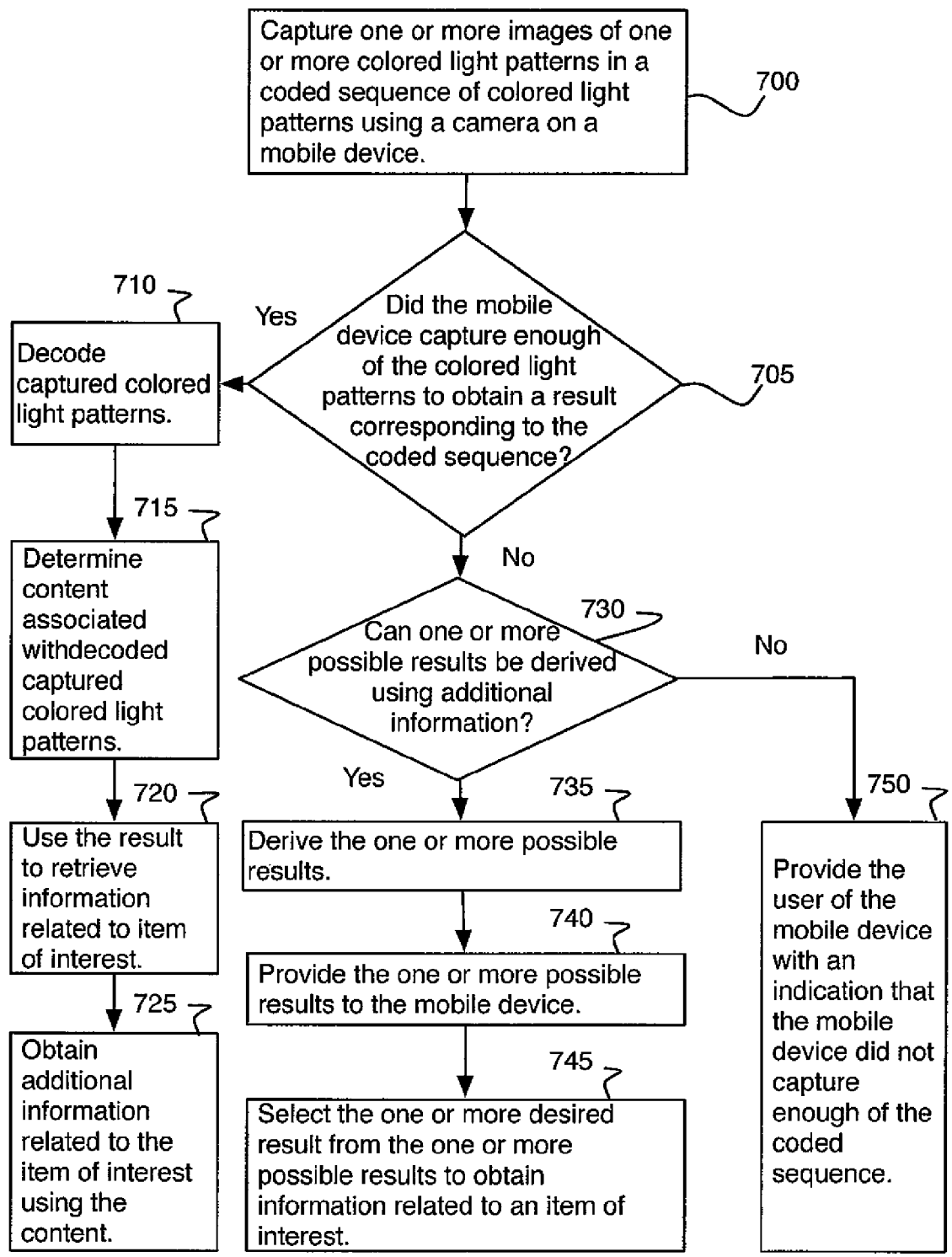
FIG. 7 illustrates a method of content distribution according to an embodiment of the present disclosure.

FIG. 7 illustrates a method of content distribution according to an embodiment of the present disclosure. In this embodiment, the camera on a mobile device, for example the camera 125 of the mobile device 120, is used to capture one or more images of one or more colored light patterns in a coded sequence of colored light patterns (block 700). The coded sequence of colored light patterns is associated with an item of interest, such as a product or service. A determination is made as to whether the mobile device captured enough of the colored light patterns to determine the content associated with the coded sequence (block 705). If the mobile device did capture enough of the colored light patterns to determine the content associated with the coded sequence, the captured colored light patterns are then decoded (block 710), and the content that corresponds to the coded sequence is determined (block 715). The result is then provided to the user of the mobile device (block 720), and information regarding the item of interest is then obtained by the user of the mobile device using the content (block 725).

If the mobile device did not capture enough of the colored light patterns to determine the content associated with the coded sequence, a determination is then made as whether one or more possible results can be derived using additional information, such as the time and the location of the capture, the retrieval history associated with mobile device, and/or the retrieval history of other mobile devices at the approximate time and location of the capture (block 730). If one or more possible results can be derived, then the one or more possible results are obtained using the additional information (block 735). The one or more possible results are then provided to the user of the mobile device (block 740). If the desired result is provided among the possible results, the user of the mobile device then selects the desired result to obtain information regarding the item of interest (block 745). If one or more possible results cannot be obtained using the additional information, an indication that the mobile device did not capture enough of the coded sequence is provided to the user of the mobile device (block 750). The user of the mobile device would then know that another capture of the coded sequence is necessary if he or she wants to obtain content regarding the item of interest.

Although the coded sequence is described above in terms of visible variations in light, one of ordinary skill in the art would recognize that there are other ways of implementing the coded sequence. For example, the coded sequence could be implemented by using non-visible variations in light as long as the camera is sensitive enough to detect the non-visible variations in the light. Using non-visible variations in light would allow the coded sequence to be delivered in a highly accurate and precise manner. The coded sequence would also be invisible and, thus, meaningless to others. If the mobile device 340 has an infrared (IR)-imaging device, the coded sequence could also be implemented using IR pulses. Using IR pulses has the advantage of being less susceptible to weather conditions.

Furthermore, although the colored elements are described as being on top of a billboard, one of ordinary skill in the art would recognize that the colored elements could be placed anywhere they can be easily seen and captured. For example, they can be placed on the sign or roof of a particular establishment. In the case of a restaurant, a person capturing the colored elements above a restaurant's signage may get a link to the restaurant's menu.

Moreover, although the use of the color codes is described above in terms of broadcast advertisement, one of ordinary skill in the art would recognize that the color codes could be used to broadcast any type of information. For example, the lights on emergency vehicles or electronic traffic signs could be used to communicate information to those in its immediate area. This information may include inclement weather conditions, traffic conditions, Amber alerts, or emergency instructions.

Furthermore, the mobile device 340 is not limited to just capturing the color codes. In one embodiment, the mobile device 340 may include a tool that allows it to broadcast color codes, for example, by displaying the color code on a display screen of the mobile device 340. This would allow the mobile device 340 to broadcast color codes to other mobile devices. The color codes broadcasted by the mobile device may also be used for submitting payment information at a point-of-sales terminal. The color codes broadcasted by the mobile device may also be used as an access key for a security system. Such a system would allow authorized people access without requiring them to carry an access card or memorize an access code.

The advantage of using the color codes is that information can be transmitted from one device to another with very little trust between the two devices. This is in contrast to Bluetooth and Wireless Fidelity (Wi-Fi), which require a relatively complex security handshake in order to exchange information.

Figure 8:
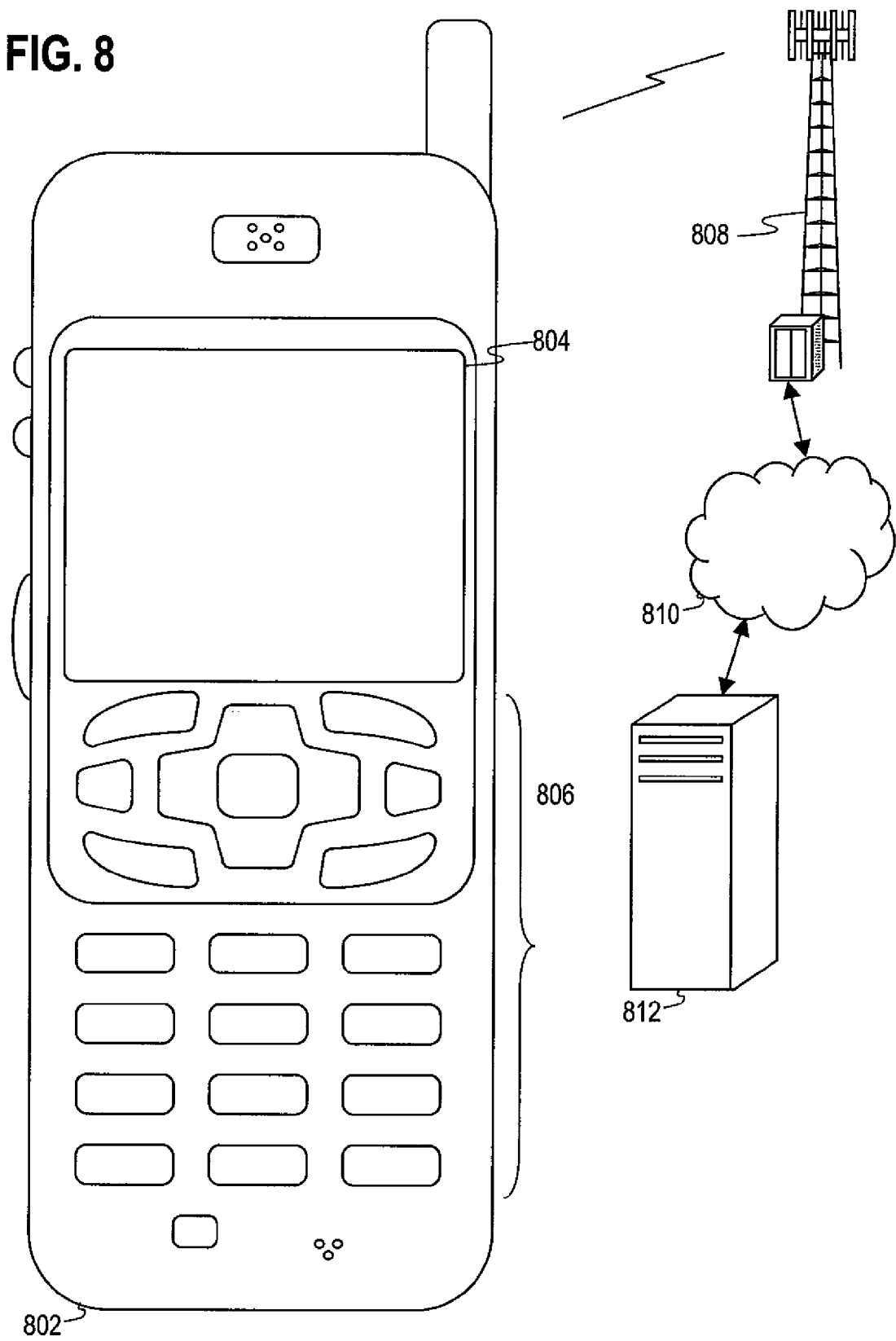
FIG. 8 illustrates a wireless communications system including a handset according to an embodiment of the present disclosure.

In one or more embodiments, the mobile device 340 may be a handset 802. FIG. 8 illustrates a wireless communications system including a handset according to an embodiment of the present disclosure. FIG. 8 depicts the handset 802, which is operable for implementing aspects of the present disclosure, but the present disclosure should not be limited to these implementations. Though illustrated as a mobile phone, the handset 802 may take various forms including a wireless handset, a pager, a personal digital assistant (PDA), a portable computer, a tablet computer, or a laptop computer. Many suitable handsets combine some or all of these functions. In some embodiments of the present disclosure, the handset 802 is not a general purpose computing device like a portable, laptop or tablet computer, but rather is a special-purpose communications device such as a mobile phone, wireless handset, pager, or PDA. The handset 802 may support specialized activities such as gaming, inventory control, job control, and/or task management functions, and so on.

The handset 802 includes a display 804 and a touch-sensitive surface or keys 806 for input by a user. The handset 802 may present options for the user to select, controls for the user to actuate, and/or cursors or other indicators for the user to direct. The handset 802 may further accept data entry from the user, including numbers to dial or various parameter values for configuring the operation of the handset. The handset 802 may further execute one or more software or firmware applications in response to user commands. These applications may configure the handset 802 to perform various customized functions in response to user interaction. Additionally, the handset 802 may be programmed and/or configured over-the-air, for example from a wireless base station, a wireless access point, or a peer handset 802.

The handset 802 may execute a web browser application which enables the display 804 to show a web page. The web page may be obtained via wireless communications with a cell tower 808, a wireless network access node, a peer handset 802 or any other wireless communication network or system. The cell tower 808 (or wireless network access node) is coupled to a wired network 810, such as the Internet. Via the wireless link and the wired network, the handset 802 has access to information on various servers, such as a server 812. The server 812 may provide content that may be shown on the display 804. Alternately, the handset 802 may access the cell tower 808 through a peer handset 802 acting as an intermediary, in a relay type or hop type of connection.

Figure 9:
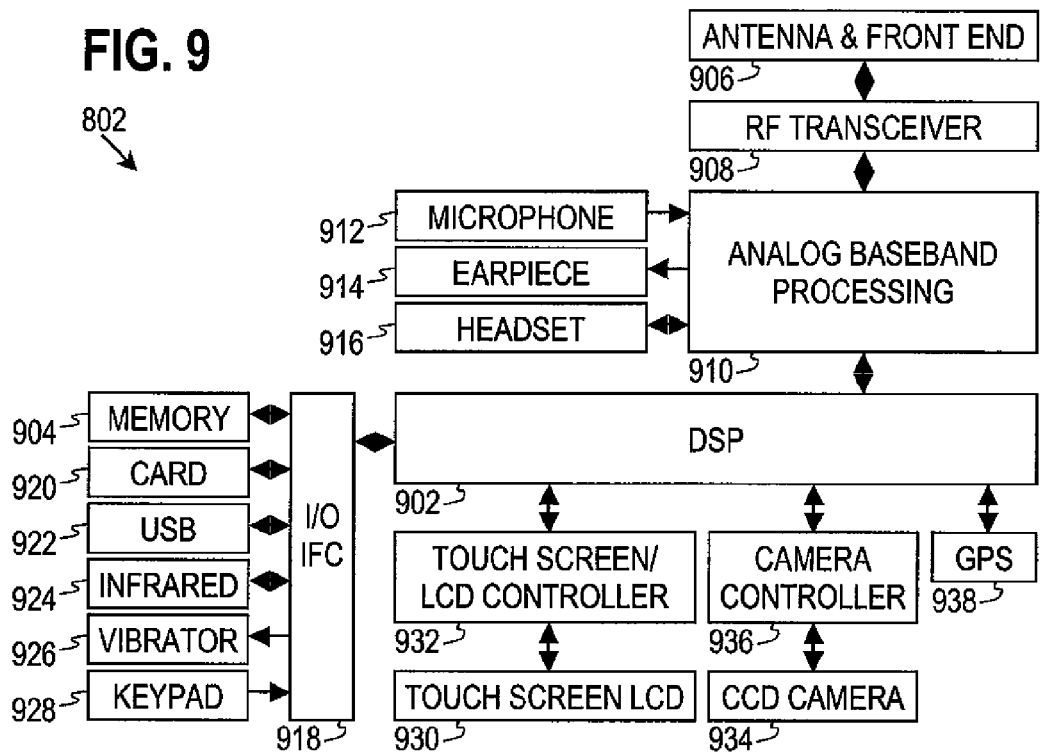
FIG. 9 is a block diagram of the handset according to an embodiment of the present disclosure.

FIG. 9 is a block diagram of the handset according to an embodiment of the present disclosure. While a variety of known components of handsets 802 are depicted, in an embodiment a subset of the listed components and/or additional components not listed may be included in the handset 802. The handset 802 includes a digital signal processor (DSP) 902 and a memory 904. As shown, the handset 802 may further include an antenna and front end unit 906, a radio frequency (RF) transceiver 908, an analog baseband processing unit 910, a microphone 912, an earpiece speaker 914, a headset port 916, an input/output interface 918, a removable memory card 920, a universal serial bus (USB) port 922, an infrared port 924, a vibrator 926, a keypad 928, a touch screen liquid crystal display (LCD) 930 with a touch sensitive surface, a touch screen/LCD controller 932, a charge-coupled device (CCD) camera 934, a camera controller 936, and a global positioning system (GPS) sensor 938. In an embodiment, the handset 802 may include another kind of display that does not provide a touch sensitive screen. In an embodiment, the DSP 902 may communicate directly with the memory 904 without passing through the input/output interface 918.

The DSP 902 or some other form of controller or central processing unit operates to control the various components of the handset 802 in accordance with embedded software or firmware stored in memory 904 or stored in memory contained within the DSP 902 itself. In addition to the embedded software or firmware, the DSP 902 may execute other applications stored in the memory 904 or made available via information carrier media such as portable data storage media like the removable memory card 920 or via wired or wireless network communications. The application software may comprise a compiled set of machine-readable instructions that configure the DSP 902 to provide the desired functionality, or the application software may be high-level software instructions to be processed by an interpreter or compiler to indirectly configure the DSP 902.

The antenna and front end unit 906 may be provided to convert between wireless signals and electrical signals, enabling the handset 802 to send and receive information from a cellular network or some other available wireless communications network or from a peer handset 802. In an embodiment, the antenna and front end unit 906 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 906 may include antenna tuning and/or impedance matching components, RF power amplifiers, and/ or low noise amplifiers.

The RF transceiver 908 provides frequency shifting, converting received RF signals to baseband and converting baseband transmit signals to RF. In some descriptions a radio transceiver or RF transceiver may be understood to include other signal processing functionality such as modulation/ demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 910 and/or the DSP 902 or other central processing unit. In some embodiments, the RF transceiver 908, portions of the antenna and front end unit 906, and the analog baseband processing unit 910 may be combined in one or more processing units and/or application specific integrated circuits (ASICs).

The analog baseband processing unit 910 may provide various analog processing of inputs and outputs, for example analog processing of inputs from the microphone 912 and the headset port 916 and outputs to the earpiece speaker 914 and the headset port 916. To that end, the analog baseband processing unit 910 may have ports for connecting to the built-in microphone 912 and the earpiece speaker 914 that enable the handset 802 to be used as a cell phone. The analog baseband processing unit 910 may further include a port for connecting to a headset or other hands-free microphone and speaker configuration. The analog baseband processing unit 910 may provide digital-to-analog conversion in one signal direction and analog-to-digital conversion in the opposing signal direction. In some embodiments, at least some of the functionality of the analog baseband processing unit 910 may be provided by digital processing components, for example by the DSP 902 or by other central processing units.

The DSP 902 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 902 may perform modulation, coding, interleaving, and spreading, and for a receiver function the DSP 902 may perform despreading, deinterleaving, decoding, and demodulation. In another embodiment, for example in an orthogonal frequency division multiplex access (OFDMA) technology application, for the transmitter function the DSP 902 may perform modulation, coding, interleaving, inverse fast fourier transforming, and cyclic prefix appending, and for a receiver function the DSP 902 may perform cyclic prefix removal, fast fourier transforming, deinterleaving, decoding, and demodulation. In other wireless technology applications, yet other signal processing functions and combinations of signal processing functions may be performed by the DSP 902.

The DSP 902 may communicate with a wireless network via the analog baseband processing unit 910. In some embodiments, the communication may provide Internet connectivity, enabling a user to gain access to content on the Internet and to send and receive e-mail or text messages. The input/output interface 918 interconnects the DSP 902 and various memories and interfaces. The memory 904 and the removable memory card 920 may provide software and data to configure the operation of the DSP 902. Among the interfaces may be the USB port 922 and the infrared port 924. The USB port 922 may enable the handset 802 to function as a peripheral device to exchange information with a personal computer or other computer system. The infrared port 924 and other optional ports such as a Bluetooth interface or an IEEE 802.11 compliant wireless interface may enable the handset 802 to communicate wirelessly with other nearby handsets and/or wireless base stations.

The input/output interface 918 may further connect the DSP 902 to the vibrator 926 that, when triggered, causes the handset 802 to vibrate. The vibrator 926 may serve as a mechanism for silently alerting the user to any of various events such as an incoming call, a new text message, and an appointment reminder.

The keypad 928 couples to the DSP 902 via the input/output interface 918 to provide one mechanism for the user to make selections, enter information, and otherwise provide input to the handset 802. Another input mechanism may be the touch screen LCD 930, which may also display text and/or graphics to the user. The touch screen LCD controller 932 couples the DSP 902 to the touch screen LCD 930.

The CCD camera 934 enables the handset 802 to take digital pictures. The DSP 902 communicates with the CCD camera 934 via the camera controller 936. The GPS sensor 938 is coupled to the DSP 902 to decode global positioning system signals, thereby enabling the handset 802 to determine its position. In another embodiment, a camera operating according to a technology other than Charge Coupled Device cameras may be employed. Various other peripherals may also be included to provide additional functions, e.g., radio and television reception.

Figure 10:
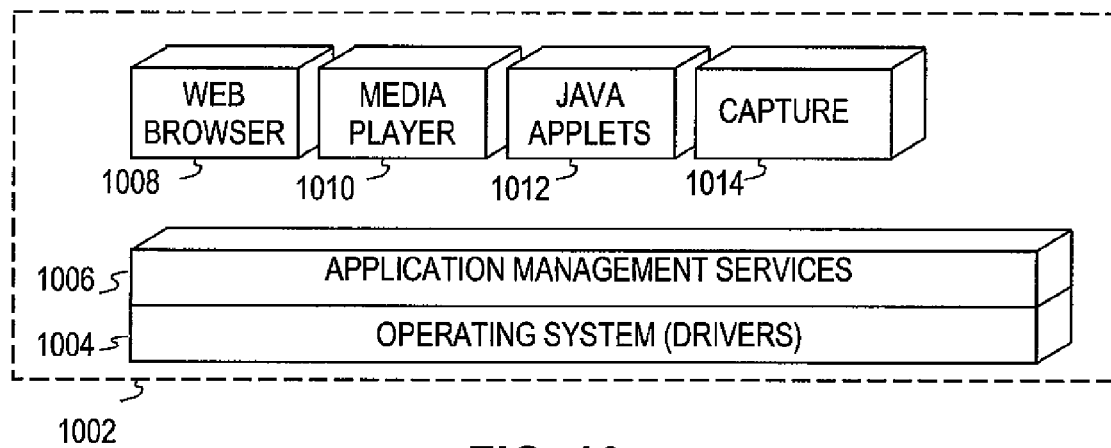
FIG. 10 illustrates a software environment that may be implemented by the handset according to an embodiment of the present disclosure.

FIG. 10 illustrates a software environment 1002 that may be implemented by the DSP 902. The DSP 902 executes operating system drivers 1004 that provide a platform from which the rest of the software operates. The operating system drivers 1004 provide drivers for the handset hardware with standardized interfaces that are accessible to application software. The operating system drivers 1004 include application management services ("AMS") 1006 that transfer control between applications running on the handset 802. Also shown in FIG. 10 are a web browser application 1008, a media player application 1010, and JAVA applets 1012. The web browser application 1008 configures the handset 802 to operate as a web browser, allowing a user to enter information into forms and select links to retrieve and view web pages. The media player application 1010 configures the handset 802 to retrieve and play audio or audiovisual media. The JAVA applets 1012 configure the handset 802 to provide games, utilities, and other functionality. The capture application 1014 is the application initiated by the user of the handset 802 for capturing images or snapshots of the color patterns according to various embodiments of the present disclosure. The capture application 1014 may include the features of the first application 130, the second application 140, and/or the resource 400.

Figure 11:
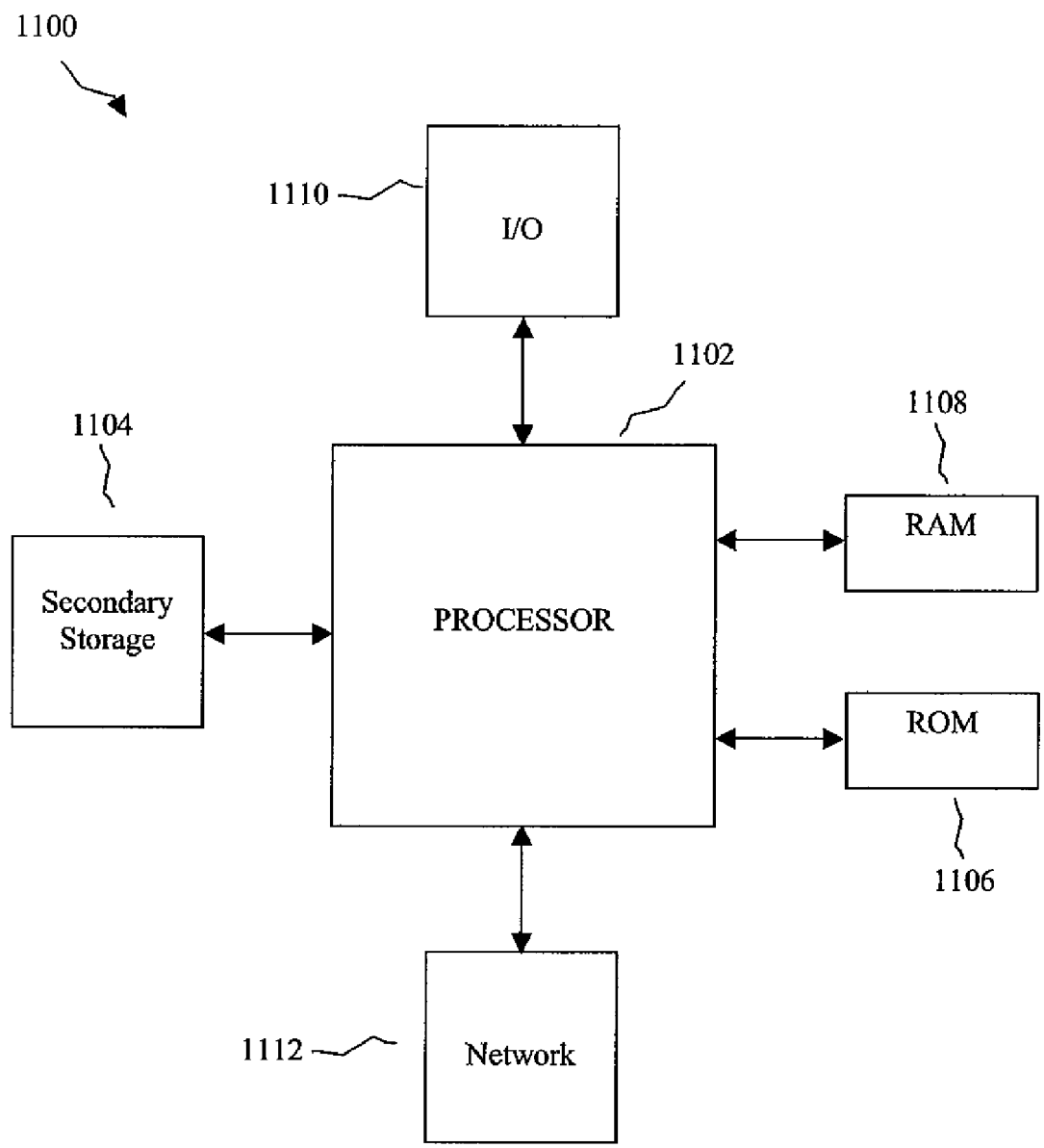
FIG. 11 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 11 illustrates a typical, general-purpose computer system suitable for implementing one or more embodiments disclosed herein. The computer system 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor may be implemented as one or more CPU chips.

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs which are loaded into RAM 1108 when such programs are selected for execution. The ROM 1106 is used to store instructions and perhaps data which are read during program execution. ROM 1106 is a non-volatile memory device which typically has a small memory capacity relative to the larger memory capacity of secondary storage. The RAM 1108 is used to store volatile data and perhaps to store instructions. Access to both ROM 1106 and RAM 1108 is typically faster than to secondary storage 1104.

I/O devices 1110 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1112 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1112 may enable the processor 1102 to communicate with an Internet or one or more intranets. With such a network connection, it is contemplated that the processor 1102 might receive information from the network, or might output information to the network in the course of performing the above-described method steps. Such information, which is often represented as a sequence of instructions to be executed using processor 1102, may be received from and outputted to the network, for example, in the form of a computer data signal embodied in a carrier wave.

Such information, which may include data or instructions to be executed using processor 1102 for example, may be received from and outputted to the network, for example, in the form of a computer data baseband signal or signal embodied in a carrier wave. The baseband signal or signal embodied in the carrier wave generated by the network connectivity devices 1112 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1102 executes instructions, codes, computer programs, scripts which it accesses from hard disk, floppy disk, optical disk (these various disk based systems may all be considered secondary storage 1104), ROM 1106, RAM 1108, or the network connectivity devices 1112. While only one processor 1102 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication system based on a sequence of color patterns, comprising:
    a mobile device capturing one or more images of one or more color patterns from a sequence of color patterns, the sequence of color patterns created by a plurality of discreet three-dimensional colored lights, wherein the three-dimensional colored lights are coupled to a public promotion space that displays information associated with a promotion, and wherein the three dimensional colored lights are coupled to the public promotion space such that vantage points from which the three dimensional colored lights are visible include vantage points from which the information displayed by the public promotion space is visible and vantage points from which the information displayed by the public promotion space is not visible; and
    an application that, when executed on a processor of the mobile device, uses the captured images to automatically retrieve additional content related to the information associated with the promotion displayed on the public promotion space.

2. The system of claim 1, wherein the application retrieves the additional content based in part on a retrieval history of the mobile device.

3. The system of claim 1, wherein the application retrieves the additional content based in part on a location of the mobile device at the time of capture, wherein the sequence of color patterns corresponds to first content when the sequence of color patterns is captured at a first location and the sequence of color patterns corresponds to second content when the sequence of color patterns is captures at a second location.

4. The system of claim 3, wherein the application retrieves the additional content based in part on a retrieval history of other mobile devices at the location of the mobile device during the time of capture.

5. The system of claim 1, wherein the application provides an indication when the mobile device captures an incomplete image of the one or more color patterns.

6. The system of claim 1, wherein the application provides a user of the mobile device with an audible presentation interface.

7. The system of claim 1, wherein a user of the mobile device directs the display of the retrieved additional content using verbal instructions.

8. The system of claim 1, wherein the three dimensional colored lights are coupled to a periphery of the public promotion space.

9. A method of content retrieval using a sequence of colored light patterns, comprising:
    capturing two or more images of two or more colored light patterns in a sequence of colored light patterns using a camera on a mobile device, the colored light patterns generated by a plurality of colored lights coupled to a public promotion space that displays information associated with a promotion;
    decoding the captured images of the two or more colored light patterns;
    identifying additional content related to the information associated with the promotion displayed on the public promotion space based on the decoding of the captured images; and
    providing the additional content to a user of the mobile device.

10. The method of claim 9, wherein the decoding is performed by an application on the mobile device.

11. The method of claim 9, wherein the decoding is performed by an application on a server.

12. The method of claim 9, wherein the decoding is performed using a resource selected from the group consisting of an association table, a look-up table, a decoding tree, and a mathematical algorithm.

13. The method of claim 9, wherein if the mobile device does not capture the entire sequence of colored light patterns, an application is able to provide one or more possible results to the user of the mobile device.

14. The method of claim 13, wherein if the application provides one or more possible results to the user of the mobile device, the user of the mobile device is able to select one or more desired result from the one or more possible results.

15. The method of claim 9, further comprising dynamically updating the two or more colored light patterns in the sequence of colored light patterns to update the additional content associated with the information associated with the promotion displayed on the banner.

16. The method of claim 9, wherein the public promotion space is a billboard.

17. The method of claim 9, wherein the additional content comprises at least one selected from the group consisting of: a uniform resource locator (URL); an electronic mail address; a coupon; and a telephone number.

18. The method of claim 9, wherein capturing further comprises capturing a different colored light pattern in each of the one or more images of the two or more colored light patterns in the sequence of colored light patterns.

19. The method of claim 9, wherein identifying additional content related to the information associated with the promotion displayed on the public promotion space is based in part on a location of the mobile device at the time of capture, wherein the additional content comprises first content when the captured image is captured at a first location and the additional content comprises second content when the captured image is captured at a second location.

* * * * *